United States Patent [19]
Music

[11] 4,205,309
[45] May 27, 1980

[54] CHARACTER GENERATOR

[75] Inventor: John Music, Melbourne, Fla.
[73] Assignee: Documation Incorporated, Melbourne, Fla.

[21] Appl. No.: 879,088
[22] Filed: Feb. 21, 1978
[51] Int. Cl.[2] .................................................. G06F 3/14
[52] U.S. Cl. .................................... 340/739; 340/731; 340/736
[58] Field of Search .................... 340/324 A, 739, 747, 340/736, 744, 750, 731

[56] References Cited

U.S. PATENT DOCUMENTS

| | | | |
|---|---|---|---|
| 3,482,239 | 12/1969 | Yanishevsky | 340/324 A |
| 3,533,096 | 10/1970 | Bouchard | 340/324 A |
| 3,594,756 | 7/1971 | Granberg et al. | 340/324 A |
| 3,691,551 | 9/1972 | Kashio | 340/324 A |
| 3,716,705 | 2/1973 | Newell | 340/324 A |

*Primary Examiner*—Marshall M. Curtis
*Attorney, Agent, or Firm*—Duckworth, Hobby, Allen & Pettis

[57] ABSTRACT

A character generator produces highly accurate electronic reproductions of characters of any chosen style on the screen of a CRT by simultaneously controlling the orientation, length and intensity of the strokes formed by the electron beam of the CRT. The character generator is coupled to an input source which periodically generates a character address signal representative of a selected character. A read only memory contains a plurality of multi-byte microprograms each located at a predetermined address. Twelve eight-bit bytes constitute a single microprogram which defines a single character. A single byte of a microprogram defines a single stroke of a character. A first three-bit element of each byte fully defines the magnitude and polarity of the X component of the stroke, while a second three-bit element of the byte defines the magnitude and polarity of the Y component of the stroke. The remaining two-bit element of the byte designates one of four available electron beam intensity levels. The read only memory sequentially reads out each byte of the microprogram designated by each sequentially received character address signal. A set of digital to analog converters converts the sequentially generated bytes from the read only memory into three independent analog signals. These analog signals control the intensity and position of the electron beam which reproduces the selected character on the screen of the CRT by forming variable length, constant intensity strokes in the pattern determined by each selected microprogram.

9 Claims, 11 Drawing Figures

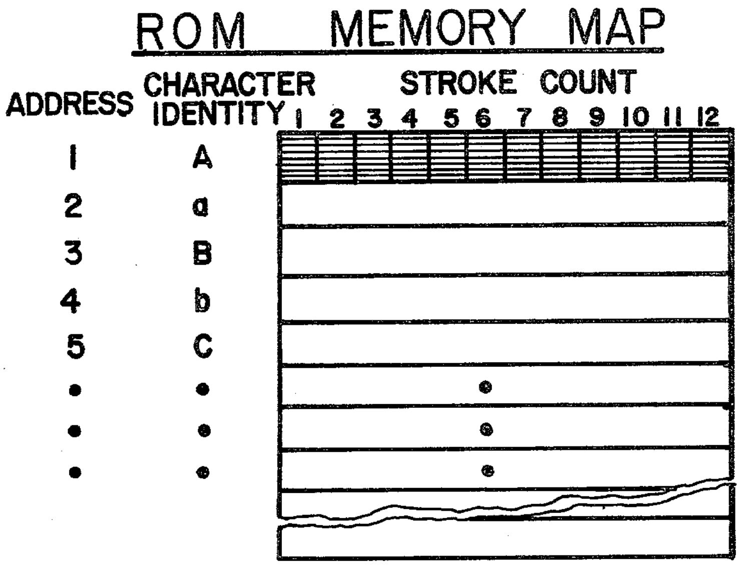
FIG 2
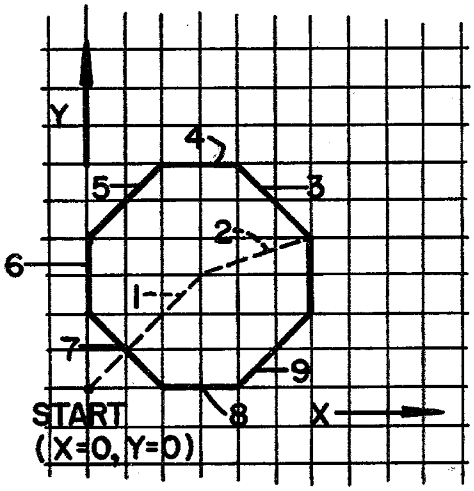
FIG. 3A
| STROKE NUMBER | STROKE VECTOR X | Y | Z |
|---|---|---|---|
| 1 | +3 | +3 | OO |
| 2 | +3 | +1 | OO |
| 3 | −2 | +2 | ON |
| 4 | −2 | 0 | ON |
| 5 | −2 | −2 | ON |
| 6 | 0 | −2 | ON |
| 7 | +2 | +2 | ON |
| 8 | +2 | 0 | ON |
| 9 | +2 | +2 | ON |
| 10 | NOT USED | | OO |
| 11 | NOT USED | | OO |
| 12 | DUMP | | OO |
FIG.3B
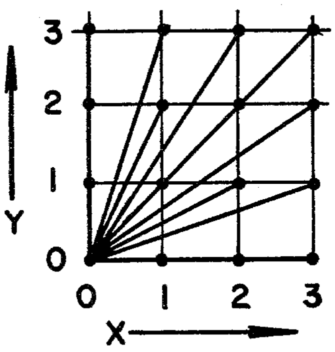
FIG.4A
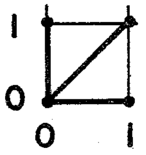
FIG. 4B

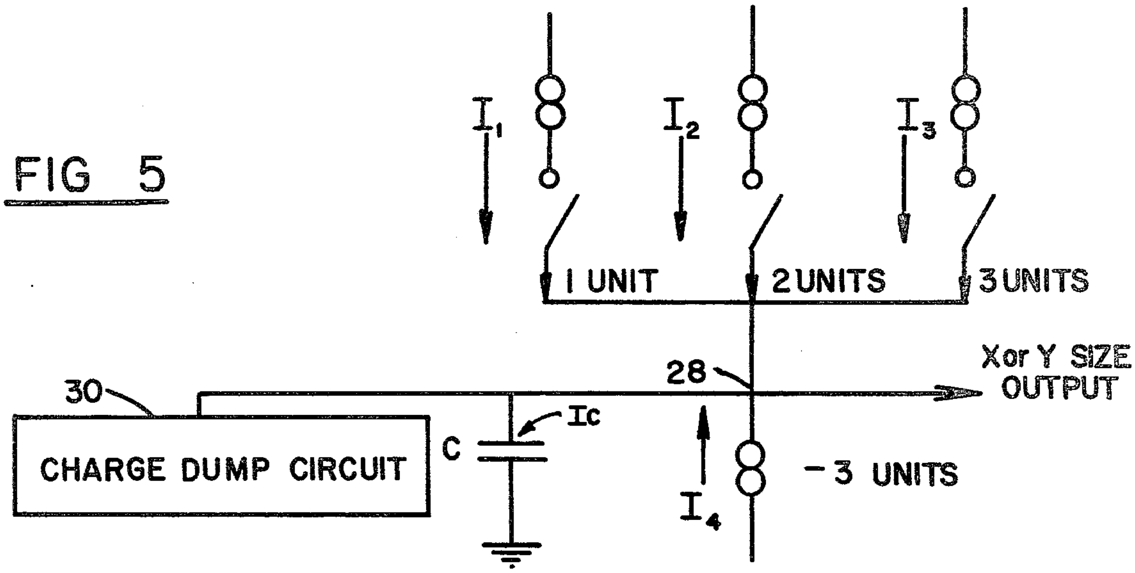
FIG 5
| $I_3$ | $I_2$ | $I_1$ | $I_c$ |
|---|---|---|---|
| 0 | 0 | 0 | = −3 |
| 0 | 0 | 1 | = −2 |
| 0 | 1 | 1 | = 0 |
| 1 | 0 | 0 | = 0 |
| 0 | 1 | 0 | = −1 |
| 1 | 0 | 1 | = +1 |
| 1 | 1 | 0 | = +2 |
| 1 | 1 | 1 | = +3 |
FIG. 6
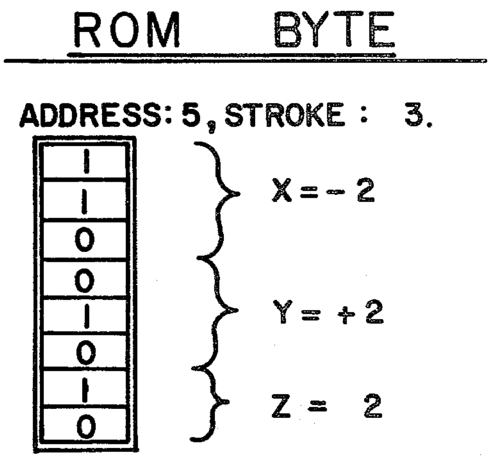
FIG. 7
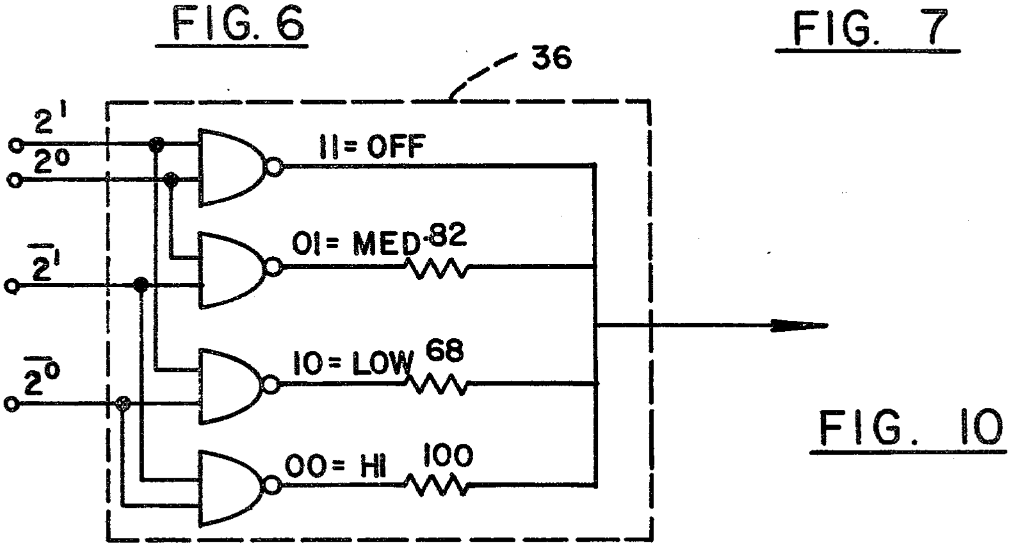
FIG. 10

CHARACTER GENERATOR

BACKGROUND OF THE INVENTION

1. Field of the Invention

This invention relates to character generators and, more particularly, to an electronic character generator which reproduces selected characters on the screen of a CRT by connecting variable length, constant intensity strokes in predetermined patterns.

2. Description of the Prior Art

A character generator having a sixty cycle per second refresh rate is highly desirable since a refresh rate of only thirty times per second often produces visible flickering, particularly in well illuminated rooms. In a CRT display having the capacity to display 6144 characters, a sixty cycle per second refresh rate requires that the character generator be able to form the most complex character in its repertoire in a 2.5 microsecond interval. The attainment of this very rapid character generation rate typically limits the complexity of the characters to block style shapes formed from vertically, horizontally and diagonally oriented strokes.

Since block style characters are often poorly defined and difficult to read, several designers have gone to great lengths to create character generators having the capability of forming accurate reproductions of more conventional and readable print styles. Meeting this design goal generally necessitates use of a slow 30 cycle per second refresh rate that provides a 5 microsecond time interval in which to form these geometrically more sophisticated characters.

The net result of designers' efforts to provide more accurate reproductions of printed characters is that the cost of character generators has remained high and as a result of the slow 30 cycle per second refresh rate the CRT displays must be placed in a room having relatively dim lighting to minimize CRT screen flicker.

U.S. Pat. No. 3,810,165 (Rosenthau) discloses a character generator which forms characters from vertical, horizontal or diagonal strokes of equal length. This system is limited to using equal length strokes since it is not capable of providing the electron beam intensity compensation necessary when variable length strokes are used to form characters. This system utilizes large numbers of stored digital bits to represent a single character since a three bit word represents either the horizontal or vertical component of a stroke while an additional sign bit is required to define either a positive or negative axis orientation for the respective X or Y magnitude component.

The Rosenthau character generator is limited to moving the CRT electron beam in any one of only eight possible directions from a single point. In this manner it generates a horizontally, vertically or diagonally oriented unit length stroke.

U.S. Pat. No. 3,755,805 (Dandrel) discloses a character generator which is capable of producing strokes of either one or two units of length. This system fails to provide any intensity compensation so that a two unit stroke would be more dimly illuminated than a one unit stroke.

This system like the Rosenthau system is limited to moving the electron beam in only one of eight possible directions.

Another prior art character generator is disclosed in U.S. Pat. No. 3,786,482 (Puckett). This apparatus is far more sophisticated than either of the two previously described character generators since it has the capability of causing the electron beam to move in any one of thirty-one possible directions from a given starting point. The refresh rate of this system is severely limited in that a comparatively lengthy time interval is required to generate a single character. While this system can accurately reproduce complex characters it requires substantial memory capacity since over fifty separate strokes are used to generate several of these complex characters and thirteen bits are required to describe each stroke. This system is further limited in that it can generate a stroke having only a single length.

Other less relevant prior art is shown and described in the following U.S. Pat. Nos.: 3,603,967 (Hauerbach); 3,643,251 (Kolb et al.); 3,671,957 (Kegelman et al.) and 3,800,183 (Halio).

SUMMARY OF THE INVENTION

It is the principle object of the present invention to provide a character generator which can produce highly accurate reproductions of print style characters by using up to eleven variable length, constant intensity strokes.

A more specific object of this invention is to provide a character generator which utilizes only eight bits of data to fully describe the intensity, orientation and length of a stroke having X and Y components of up to three units in length.

A further object of this invention is to provide a character generator which can form any one of one hundred and twenty-eight characters in less than 2.5 microseconds and thereby permit a sixty cycle per second refresh rate to eliminate flickering of the CRT screen.

Still another object of this invention is to provide a character generator which is able to produce visible characters having from five to ten times greater brightness than available prior art character generators.

Yet another object of the present invention is to provide a character generator which requires substantially fewer electronic components and which is substantially cheaper to purchase than existing devices.

Briefly stated, and in accord with one embodiment of the invention, a character generating apparatus produces highly accurate electronic reproductions of characters of any chosen style on the screen of a CRT by simultaneously controlling the orientation, length and intensity of strokes formed by an electron beam within the CRT. The character generator is coupled to an input source which periodically generates a character address signal representative of a selected character.

The apparatus includes memory means which contains a plurality of multi-byte microprograms, each located at a predetermined address within the memory and completely describing a single character. The memory means sequentially reads out each byte of the microprogram designated by each sequentially received character address signal. Each byte contains digital data which defines the length and polarity of the X and Y axis components and the intensity of each stroke formed by the electron beam.

The character generator also includes digital to analog converter means for converting the sequentially generated bytes from the memory means into three independent analog signals. These analog signals control the intensity and position of the electron beam which reproduces the selected character on the screen of the CRT by connecting constant intensity, variable length strokes in the pattern determined by each selected microprogram.

BRIEF DESCRIPTION OF THE DRAWINGS

The invention is pointed out with particularly in the appended claims. However, other objects and advantages together with the operation of the invention may be better understood by reference to the following detailed description taken in conjunction with the following illustrations wherein:

FIG. 2 represents a memory map of the read only memory of the present invention.

FIGS. 3A and 3B disclose a graphical sketch of the letter "C" and a table illustrating the various magnitude and polarity elements associated with each stroke interval required to form the letter "C".

FIGS. 4A and 4B illustrate the dramatically increased capability of the present system for generating variously oriented multi-length strokes.

FIG. 5 illustrates the circuit elements used to generate a digital signal representative of polarity and magnitude of the X or Y stroke component.

FIG. 6 is an encoding table used to convert the polarity and magnitude of X and Y stroke components into digital bits which can be stored in ROM 22.

FIG. 7 illustrates the eight-bit byte required to describe the X,Y and Z components of the third stroke of the letter "C".

FIG. 10 is a detailed schematic diagram of the essential elements of digital to analog converter 36.

DESCRIPTION OF THE PREFERRED EMBODIMENT

Figures 1, 8:
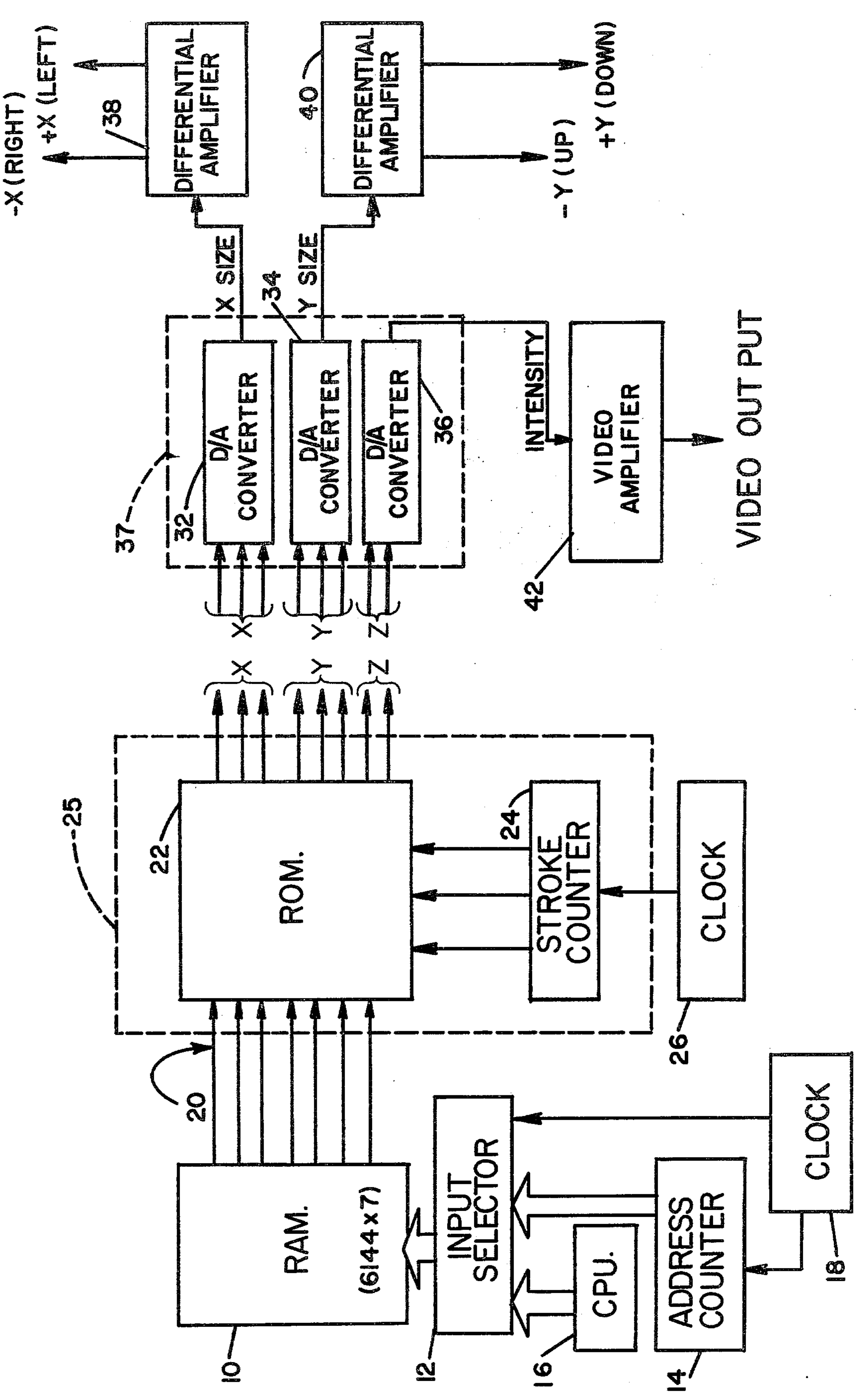
FIGS. 1 and 8 taken together represent a functional block diagram of one embodiment of the present invention.

In order to better illustrate the advantages of the invention and its contributions to the art, a preferred hardware embodiment will now be described in some detail. It will be assumed in connection with the description of the preferred embodiment that the CRT display apparatus and other equipment associated with the character generator are able to display 6144 separate characters and that the system described is capable of producing 128 discrete characters.

Random Access Memory (RAM) 10 contain 6144 separately addressable seven-bit storage positions. Each of these storage positions corresponds to one of the 6144 display positions on the screen of the CRT display. A seven-bit capacity for each memory storage position is needed since any one of the available one hundred and twenty-eight characters may be utilized for any given display position.

Input selector 12 directs an input signal to RAM 10 from either address counter 14 or from a central processor unit (CPU) 16. A clock interval of 2.5 microseconds is defined by clock 18. Address counter 14 is incremented once every clock interval from a count of 1 to a count of 6144.

Once during each clock interval address counter 14 is coupled to the imput of RAM 10 by input selector 12 in order to increment the address of RAM 10. At another time during each clock interval input selector 12 couples CPU 16 to the input of RAM 10 to permit new data to be written into the selected storage position.

Once during each clock interval the contents of the selected storage position of RAM 10 will read out on a seven-bit character address line 20 to the input of read only memory (ROM) 22.

Each one of the possible one hundred and twenty-eight memory addresses in ROM 22 stores a microprogram containing sufficient digital data to fully describe a single character. FIG. 2 illustrates a memory map of the contents of ROM 22. In the embodiment shown ROM address 1 identifies the character "A", while address 5 identifies the character "C". Each address identifies a stored microprogram. which consists of twelve eight-bit bytes. The first eleven bytes of each microprogram are set aside to store digital data defining the magnitude and polarity of the X and Y components of the strokes and the stroke intensity required to form any of the one hundred and twenty-eight available characters. The twelfth byte is addressed at a time during each clock interval after the formation of the character designated by RAM 10 has been completed in order to permit the electron beam to return to a position from which it can commence the next subsequent character at the beginning of the next clock interval.

Stroke counter 24 in FIG. 1 is incremented by clock 26 which has a 2.5 microsecond period. Stroke counter 24 divides each clock interval into twelve sub-intervals for the purpose of sequentially reading out each of the twelve stored bytes in a single microprogram. ROM 22 and stroke counter 24 comprise memory means 25.

By referring to FIGS. 3A and 3B the method of determining the contents of a microprogram which identifies one possible configuration for the character "C" will now be explained. FIG. 3A is a graphical representation of the character "C". The horizontal axis of the graph will be referred to as the X axis, while the vertical axis will be referred to as the Y axis. The CRT electron beam begins to write the character "C" by beginning at the point X=0, Y=0 as shown. FIG. 3B identifies the stroke numbers and X,Y and Z components of each stroke vector. The stroke vector component Z defines the intensity of the electron beam. A zero value for Z causes the electron beam to turn off. The Z values of 01, 10 and 11 represent respectively low, medium and high electron beam intensities. As the values for Z must be determined for each particular type of CRT display, no precise values of Z have been set forth in FIG. 3B.

While the electron beam is being positioned during the first and second strokes, its intensity is reduced or turned "off" (Z=00) so that it will not be visible. The first stroke is made as long as possible (3 units of X and Y displacement in the preferred embodiment) to minimize the total number of strokes required to form the character "C". Stroke one is displaced three units to the right along the X axis and three units upward along the Y axis. In FIG. 3B this initial movement is graphically described as a displacement of +3,+3. In order for the second stroke to arrive at the position where the first visible stroke of the character "C" will be commenced, a displacement of +3 units along the X axis and +1 unit along the Y axis is required. The value of Z is still zero since the electron beam must remain invisible during the second positioning stroke.

FIGS. 3A and 3B taken together describe all of the stroke vector components needed to form the letter "C". Displacements to the left are indicated by negative values of X while downward displacements are indicated by negative values of Y. Since only nine strokes are required to fully describe the letter "C", microprogram bytes ten and eleven are not used and the electron beam intensity is turned off. During the twelfth stroke interval the electron beam remains off and is repositioned in preparation for commencing the next subsequent character.

FIG. 4A indicates that the preferred embodiment has the capability of forming sixteen distinct strokes within the upper right hand quadrant for a total of forty eight possible positions from a single point of origin. FIG. 4B represents the typical prior art character generator stroke positioning capability. The capability of prior art systems is highly limited since most can only position a stroke within three positions in the upper right hand quadrant for a total of eight positions throughout all four quadrants. Clearly the system of the present invention can more accurately reproduce complex characters in a shorter time interval than prior art units as a result of its ability to vary the stroke length from one to three units to provide thirty two different angular displacements of the stroke from a single point while prior art units typically provide single unit stroke lengths with only eight available angular displacements.

FIG. 3B indicates that numerous values of X and Y used to describe the character "C" have a negative polarity. Since only three bits in each byte of a microprogram are allocated to describe both the magnitude and polarity of either the X or Y components of a stroke, a unique encoding system had to be developed to permit representation of both the magnitude and the polarity of the X and Y stroke components in a single three-bit word. This encoding system will now be described.

Referring to FIG. 5, current sources $I_1$, $I_2$ and $I_3$ are coupled by means of single pole single throw switches to node 28. The magnitude of the currents generated by current sources $I_1$, $I_2$ and $I_3$ are respectively 1, 2 and 3 current units. Current source $I_4$ is coupled directly to node 28 and has an output current of negative three units. Capacitor C is coupled between node 28 and ground. During the dump interval which occurs during stroke number twelve of each clock interval, charge dump circuit 30 is actuated to charge or discharge capacitor C to a predetermined reference voltage. During the other stroke intervals charge dump circuit 30 is decoupled from node 28. The following equation defines the relationship between the capacitor voltage and the current flow into or out of capacitor C:

$$E_c = I_c T / C$$

Since $E_c$ is directly proportional to $I_c$, the current flow into or out of capacitor C will be directly proportional to the voltage at node 28. FIG. 6 indicates the magnitude of $I_c$ when current sources $I_1$, $I_2$ and $I_3$ are selectively coupled to node 28. A binary zero indicates that the switch controlling a current source is open, while a binary one indicates that the switch is closed. When all three switches are open (000), $I_c$ has a value of $-3$. When all three switches are closed (111), $I_c$ has a value of $+3$. In this manner a three-bit binary word can be utilized to represent either a positive or negative component polarity and a component magnitude of either zero, one, two or three. This unique encoding system permits the utilization of no more than eleven eight-bit bytes to fully describe the intensity, magnitude and orientation of all strokes necessary to form any of one hundred twenty-eight possible characters.

Utilizing the information in FIG. 3B and FIG. 6, FIG. 7 indicates the data content of the third byte of the microprogram representative of the letter "C". An X component of minus two is represented by the binary bits 110; a Y component of plus two is represented by the binary bits 010; an assumed intensity value of Z equals two is represented by the binary bits 10. The data content of the remaining bytes of the microprogram in memory address five of Rom 22 is readily determined from the information disclosed in FIG. 3B and FIG. 6.

The three-bit outputs on the X and Y output lines from ROM 22 are coupled to identical digital to analog converters 32 and 34 as shown in FIG. 8. Each of these D/A converters contains a circuit like that illustrated in FIG. 5 to decode the X and Y digital input signals and generate first and second analog output signals representative of the magnitude and polarity of the X and Y components of single strokes.

Figure 9:
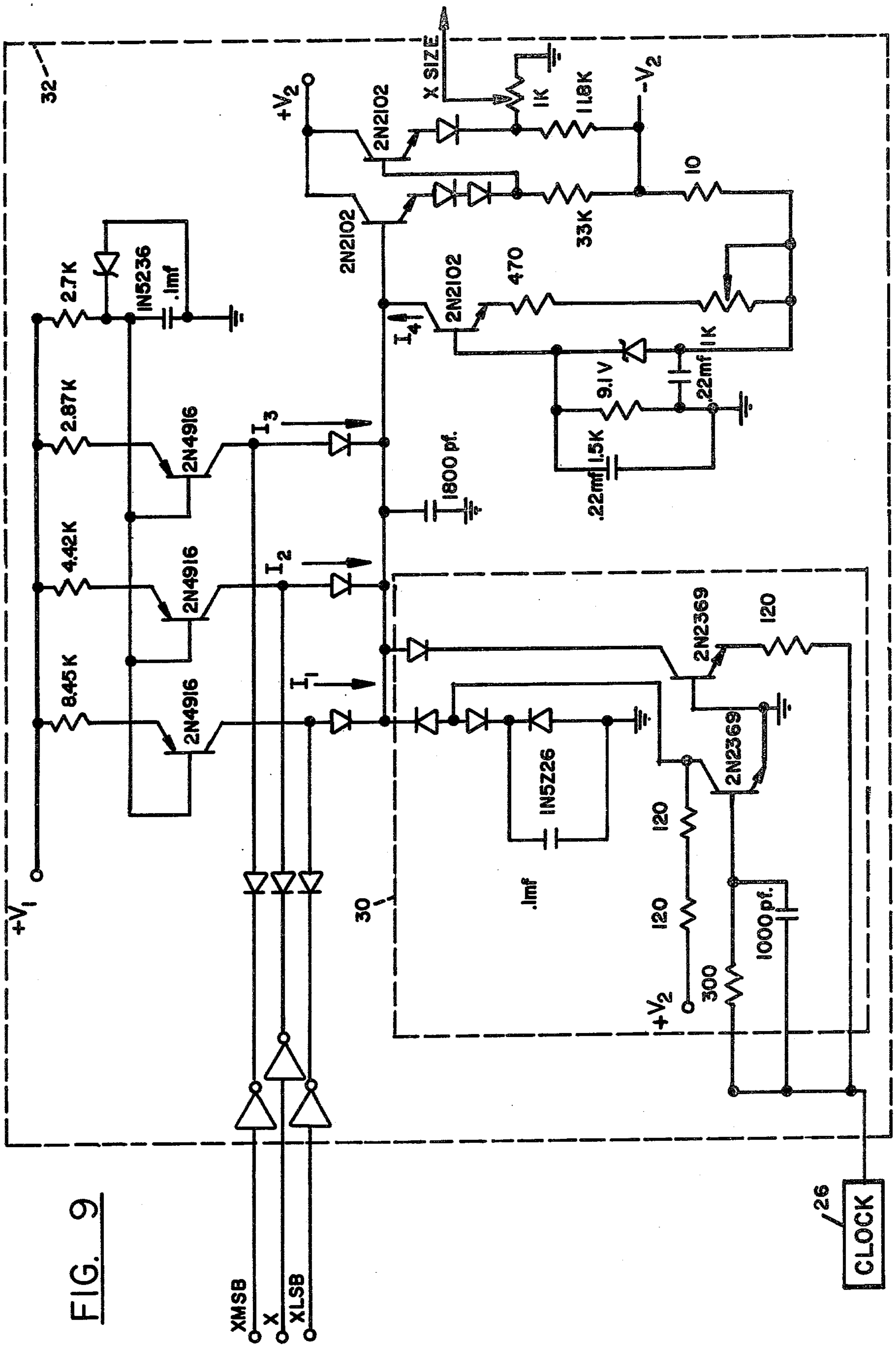
FIG. 9 is a detailed schematic diagram of digital to analog converter 32.

FIG. 9 is a schematic diagram of D/A converter 32. The groups of electronic components which represent capacitor C, current generators $I_1$–$I_4$ and charge dump circuit 30 have been marked and identified.

Referring once again to FIG. 8, the Z output signal from ROM 22 is coupled to the input of D/A converter 36 which converts the digital intensity signal into an analog intensity signal. FIG. 10 is a more complete schematic representation of D/A converter 36. D/A converters 32,34 and 36 are referred to collectively as D/A converter means 37.

The X and Y analog output signals from D/A converters 32 and 34 are coupled to the inputs of differential amplifiers 38 and 40. The outputs from these two differential amplifiers are coupled to the X and Y deflection plates of the CRT display unit. The output of D/A converter 36 is coupled to a video amplifier 42 which controls the video output circuitry of the CRT display unit.

While the letter "C" illustrated in FIG. 3A is highly angular in appearance, the frequency response of the entire character generator system is controlled so that all of the intersections of the various strokes are well rounded. The resulting displayed character conforms very closely to the letter "C" as it might be mechanically printed on a typewriter.

A number of special emphasis commands can readily be adapted to function in connection with the above described character generator system. Character underscoring, superscripting, subscripting, half-brightness level and character blink are five special features which have been used in conjunction with the system of the preferred embodiment.

As a result of the unique structure and coding utilized in the present system substantial reductions in the number of electrical components formerly required to fabricate character generators have been possible so that significant economies can be realized.

It will be apparent to those skilled in the art that the disclosed character generator may be modified in numerous ways and may assume many embodiments other than the preferred form specifically set out and described above. Accordingly, it is intended by the appended claims to cover all such modifications of the invention which fall within the true spirit and scope of invention.

I claim:

1. A character generator for generating highly accurate electronic reproductions of characters of any chosen style on the screen of a CRT display unit by simultaneously controlling the orientation, length and intensity of substantially linear strokes formed by the electron beam of the CRT comprising:

a. input means for receiving data representative of selected characters and converting said data into digital character addresses;

b. random access memory means coupled to said input means and having a data storage position corresponding to each CRT display position for storing a digital character address in each storage position, each digital character address being representative of the character to be displayed in each CRT screen display position;

c. means coupled to said random access memory means for loading digital character addresses into selected memory storage positions of said random access memory means and for sequentially reading out on a data output line the digital character addresses stored in said random access memory means;

d. read only memory means, including a plurality of multi-byte microprograms each stored at a predetermined address of said read only memory means and representative of a single character, coupled to the data output line of said random access memory means for sequentially reading out each byte of the microprogram designated by each sequentially received digital character address, each byte containing digital data defining the magnitude and direction of the X, Y and Z components of each stroke formed by the electron beam; and e. digital to analog converter means coupled to said read only memory means for converting the sequentially generated bytes of each microprogram read out from said read only memory means into three independent analog signals, said digital to analog converter means having X, Y and Z output lines and including i. X fixed current source means coupled to the X output line for transferring a fixed magnitude current having a first polarity to the X output line ii. X variable current source means coupled to the X output line for transferring a variable magnitude current having a second polarity to the X output line, the magnitude of the variable magnitude current being representative of the digital data in each byte which defines the magnitude and direction of the X component of each stroke, the fixed and variable magnitude currents being additively combined on the X output line iii. Y fixed current source means coupled to the Y output line for transferring a fixed magnitude current having a first polarity to the Y output line.

iv. Y variable current source means coupled to the Y output line for transferring a variable magnitude current having a second polarity to the Y output line, the magnitude of the variable magnitude current being representative of the digital data in each byte which defines the magnitude and direction of the Y component of each stroke, the fixed and variable magnitude currents being additively combined on the Y output line.

v. Z variable current source means coupled to the Z output line for transferring a current to the Z output line having a magnitude representative of the digital data in each byte which defines the intensity of each stroke;

whereby said digital to analog converter means converts the sequentially generated bytes of each microprogram read out from said read only memory means into three independent analog signals for controlling the position and intensity of the CRT electron beam to form a selected character on the screen of the CRT by connecting substantially constant intensity, variable length linear strokes in patterns determined by each selected microprogram.

2. The character generator of claim 1 wherein said X variable current source means includes:

a. first current source means for generating an output current of one unit magnitude and the second polarity;

b. second current source means for generating an output current of two units magnitude and the second polarity;

c. third current source means for generating an output current of three units magnitude and the second polarity; and d. switch means coupled to said first, second and third current source means and to the X output line for selectively coupling the output of said first, second and third current source means to the X output line.

3. The character generator of claim 2 wherein said Y variable current source includes:

a. first current source means for generating an output current of one unit magnitude and the second polarity;

b. second current source means for generating an output current of two units magnitude and the second polarity;

c. third current source means for generating an output current of three units magnitude and the second polarity; and d. switch means coupled to said first, second and third current source means and to the X output line for selectively coupling said first, second and third current source means to the Y output line.

4. The character generator of claim 1 wherein each byte of the microprogram stored in said read only memory means is eight bits in length.

5. The character generator of claim 4 wherein each of said microprograms includes twelve bytes of digital data.

6. The character generator of claim 1 wherein said read only memory means includes stroke counter means for sequentially addressing each byte of the microprogram designated by each digital character address.

7. The character generator of claim 1 wherein said read only memory means includes an X read out line for reading out the bits of each byte which designate the polarity and magnitude of the X component of each stroke.

8. The character generator of claim 7 wherein said read only memory means includes a Y read out line for reading out the bits of each byte which designate the polarity and magnitude of the Y component of each stroke.

9. The character generator of claim 8 wherein said read only memory means includes a Z output line for reading out the bits of each byte which designate the intensity of the electron beam during the formation of each stroke.

10. The character generator of claim 1 wherein said digital to analog converter means includes:

a. a capacitor coupled to said X output line; and b. charge dump circuit means coupled to said X output line for resetting the voltage level on said capacitor to a predetermined level before said digital to analog converter means receives the first byte of a subsequent microprogram.

11. The character generator of claim 10 wherein said digital to analog converter means includes:

a. a capacitor coupled to said Y output line; and b. charge dump circuit means coupled to said Y output line for resetting the voltage level on said capacitor to a predetermined level before said digital to analog converter means receives the first byte of a subsequent microprogram.

12. The character generator of claim 11 further including frequency response limited means coupled in series with the X output line and the Y output line to limit the frequency response of said digital to analog converter means.

* * * * *